Jan. 9, 1945.   H. G. WIEST   2,367,079

DYNAMOELECTRIC MACHINE

Filed Oct. 16, 1942

Inventor:
Horace G. Wiest,
by *Harry E. Dunham*
His Attorney.

Patented Jan. 9, 1945

2,367,079

UNITED STATES PATENT OFFICE 2,367,079

DYNAMOELECTRIC MACHINE

Horace G. Wiest, Wilmington, Del., assignor to General Electric Company, a corporation of New York Application October 16, 1942, Serial No. 462,230

3 Claims. (Cl. 172—275)

My invention relates to dynamo-electric machines and particularly to an improved field exciting member for such machines having a distributed exciting winding of the concentric type.

An object of my invention is to provide an improved field exciting member for a dynamo-electric machine.

Another object of my invention is to provide an improved dynamo-electric machine field exciting member having a distributed winding of the concentric coil type.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
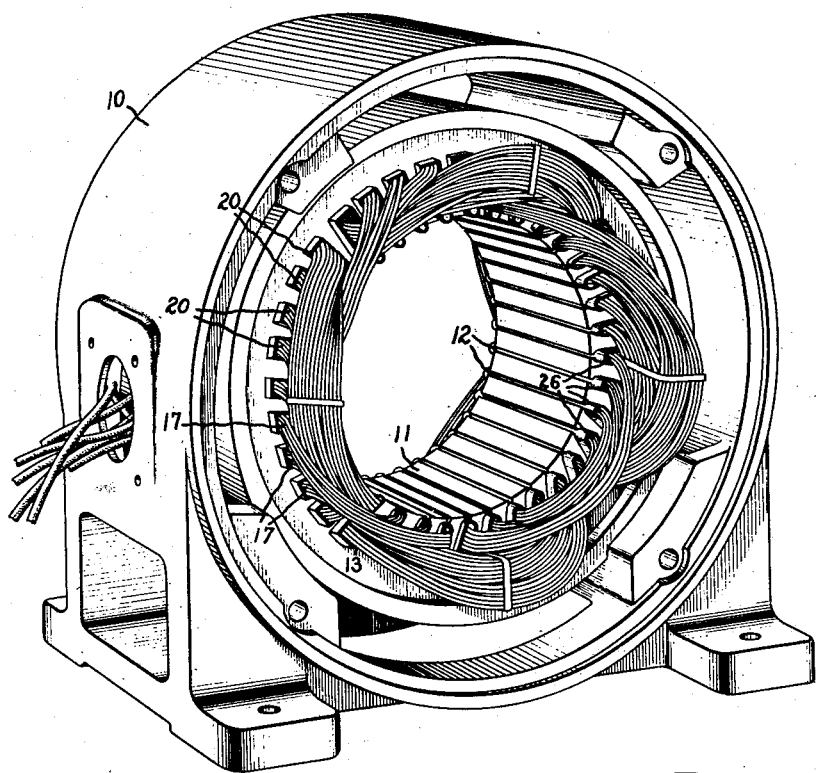
Figure 2:
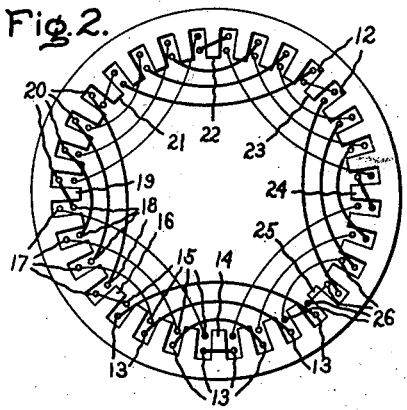

In the drawing, Fig. 1 is a perspective view of a dynamo-electric machine stationary member provided with an embodiment of my improved field exciting member; Fig. 2 is a schematic end view of the stationary member of a dynamo-electric machine similar to that shown in Fig. 1; and Fig. 3 is a modification of the arrangement shown in Figs. 1 and 2.

Referring to the drawing, I have shown a dynamo-electric machine stationary member having a frame 10 within which is arranged a stationary field exciting member provided with a laminated core 11 of magnetic material. The core 11 is formed with a plurality of winding slots 12 within which a field exciting winding is arranged. This field exciting winding is of the concentric coil type wherein a plurality of poles is formed by the winding, and each pole is excited by a plurality of substantially concentric coils arranged about each respective pole. The field exciting winding shown in the drawing includes a main winding having a plurality of substantially concentric coils arranged with one side of each coil in adjacent winding slots. An auxiliary or starting winding is arranged to provide a plurality of auxiliary poles about the machine intermediate the above-mentioned main poles. The coils of the auxiliary winding also are of the substantially concentric type and are arranged with only one side of the auxiliary coils in each winding slot. In dynamo-electric machines having distributed field exciting windings, such as those shown in the drawing, in which the coils each have two sides connected by end turns and are of the concentric type and an auxiliary winding is provided for starting the machine, it has been found that the end turns of the coils arranged in the bottoms of the slots may become excessively heated due to the covering-over of these end turns by the end turns of the coils arranged in the tops of the slots. In my improved construction, corresponding sides of adjacent coils are arranged in the bottoms of the slots and the other corresponding sides of these coils are arranged in the tops of other slots, such that the connecting end turns of the coils are arranged in overlapping relationship and extend from the bottom of one slot to the top of another slot. With this construction, the ventilating air circulating into intimate contact with end turns of substantially all of the coils provides a more efficient cooling system.

Figs. 1 and 2 illustrate a construction of this type in which all of the sides 13 of the substantially concentric coils about a main pole 14 of the field exciting member are arranged in the bottoms of the winding slots. The coils of such a winding are adapted to be form wound and then inserted into the respective winding slots. It has been found more practical to begin the winding of such a field exciting winding by arranging all of the sides 13 of the substantially concentric coils of one of the main poles 14 in the bottoms of the slots, as shown in Figs. 1 and 2. The substantially concentric auxiliary winding coils of the adjacent auxiliary pole 16 to the left of the main pole 14 then are inserted over one-half of the sides 13 of the coils about the main pole 14 and the other corresponding sides 17 of the auxiliary winding about the auxiliary pole 16 are placed substantially in the bottoms of the winding slots 12. The sides 18 of the coils about the adjacent main pole piece 19 in a clockwise direction then are successively arranged in the tops of the winding slots above the lower coil sides 17 of the auxiliary winding about the auxiliary pole 16. The sides 20 of the coils about the main pole piece 19 then are arranged successively in the bottoms of slots 12. This procedure is followed in the assembly of the coils of the auxiliary and main windings about the auxiliary and main poles 21, 22, 23, and 24, respectively. When all of the sides of the coils about the main pole 24 have been inserted in winding slots, only tops of winding slots remain for the insertion of the sides of the coils about the auxiliary pole 25. As shown in Figs. 1 and 2, all of the sides 26 of the substantially concentric coils about the auxiliary pole 25 are arranged in the tops of the winding slots. This does not provide a completely symmetrical winding arrangement, but has been found to be less costly to assemble and to provide a substantial improvement over a winding of the conventional type.

Figure 3:
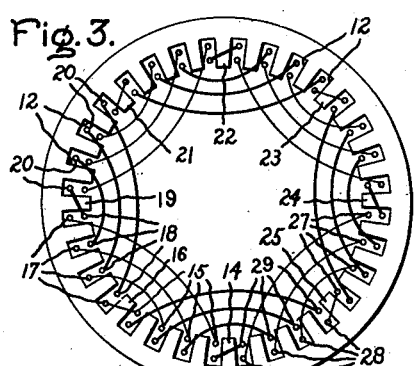

Fig. 3 illustrates a modification of the construction shown in Figs. 1 and 2 in which corresponding sides of all of the coils of both windings are arranged in the bottoms of the slots and the other corresponding sides of all of the winding coils are arranged in the tops of the slots. This provides a completely symmetrical winding and may be constructed in a manner similar to the method of assembling the winding shown in Figs. 1 and 2, except for the last step. In making a symmetrical winding, the right-hand sides of the concentric coils of the main winding about the first main pole 14, as viewed in the figures, are not inserted into slots in the first assembly step or are removed from the winding slots and the concentric coils of the auxiliary winding about the pole 25 are inserted into the winding slots 12 in the same manner as the coils for all of the other poles; that is, with one of the coil sides 27 of each concentric coil arranged above a coil side of the concentric main winding coils about the main pole piece 24 and the other sides 28 of the auxiliary winding coils arranged in the bottoms of the slots from which the sides 29 of the concentric main winding coils about the pole piece 14 were removed. The sides 29 of the main winding coils then are inserted in the winding slots 12 above the auxiliary winding coil sides 28, thereby completing a symmetrical winding arrangement wherein corresponding coil sides of all of the coils are successively arranged in the bottoms of the slots, and the other corresponding coil sides of all of the coils are arranged in the tops of other winding slots.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamo-electric machine field exciting member having a core of magnetic material, winding slots in said core, a winding in said winding slots having a plurality of coils arranged to provide a plurality of poles, groups of said coils being arranged substantially concentrically about each pole, said coils having two sides connected by end turns with corresponding sides of some of said coils being arranged in the bottoms of some of said slots, the other corresponding sides of said some of said coils being arranged in the tops of other of said slots with the connecting end turns of said coils arranged in overlapping relationship, both sides of the coils about one of said poles being arranged in the bottoms of some of said slots, and both sides of the coils about one pole adjacent said last-mentioned pole being arranged in the tops of some of said slots.

2. A dynamo-electric machine field exciting member having a core of magnetic material, winding slots in said core, a main winding in said winding slots having a plurality of coils arranged to provide a plurality of main poles, an auxiliary winding in said winding slots having a plurality of coils arranged to provide a plurality of auxiliary poles, groups of said coils of each winding being arranged substantially concentrically about each respective pole, all of said coils having two sides connected by end turns with corresponding sides of some of said coils of each winding arranged successively in the bottoms of some of said slots, the other corresponding sides of said some of said coils being arranged successively in the tops of other of said slots with connecting end turns of said coils arranged in overlapping relationship, both sides of the coils about one of said main poles being arranged in the bottoms of said slots, and both sides of the coils about one of said auxiliary poles adjacent said last-mentioned main pole being arranged in the tops of said slots.

3. A dynamo-electric machine field exciting member having a core of magnetic material, winding slots in said core, a main winding in said winding slots having a plurality of coils arranged to provide a plurality of main poles, an auxiliary winding in said winding slots having a plurality of coils arranged to provide a plurality of auxiliary poles with an auxiliary pole intermediate adjacent of said main poles, groups of said coils of each winding being arranged substantially concentrically about each respective pole, all of said coils having two sides connected by end turns with corresponding sides of some of said coils of each winding arranged in the bottoms of some of said slots, the other corresponding sides of said some of said coils being arranged in the tops of other of said slots with the connecting end turns of said coils arranged in overlapping relationship, both sides of the coils about one of said main poles being arranged in the bottoms of said slots, and both sides of the coils about one of said auxiliary poles adjacent said last-mentioned main pole being arranged in the tops of said slots.

HORACE G. WIEST.